United States Patent [19]

Okihara et al.

[11] Patent Number: 5,343,917
[45] Date of Patent: Sep. 6, 1994

[54] PNEUMATIC RADIAL TIRE FOR PASSENGER CAR WITH DEFINED TREAD DEPTHS

[75] Inventors: Masakazu Okihara, Hiratsuka; Tomohiko Kogure, Ashigara, both of Japan

[73] Assignee: The Yokohama Rubber Co., Ltd., Tokyo, Japan

[21] Appl. No.: 899,970

[22] Filed: Jun. 17, 1992

[30] Foreign Application Priority Data

Jul. 8, 1991 [JP] Japan .................... 3-166987

[51] Int. Cl.$^5$ ............... B60C 11/04; B60C 9/18
[52] U.S. Cl. ............... 152/209 R; 152/527; 152/537
[58] Field of Search ............ 152/209 R, 209 D, 526, 152/527, 537

[56] References Cited

U.S. PATENT DOCUMENTS

| | | | |
|---|---|---|---|
| 4,718,470 | 1/1988 | Kusakabe et al. | 152/527 |
| 4,819,705 | 4/1989 | Caretta | 152/526 |
| 4,884,607 | 12/1989 | Mori | 152/209 R |
| 4,986,324 | 1/1991 | Suzuki et al. | 152/209 |
| 5,000,239 | 3/1991 | Brayer et al. | 152/209 R |
| 5,135,038 | 8/1992 | Grass et al. | 152/209 R |

FOREIGN PATENT DOCUMENTS 2066171 7/1981 United Kingdom ............ 152/209 R

OTHER PUBLICATIONS

"Pneumatic Tyre Design", E. C. Woods, 1955, pp. 32–34.
1992 YearBook, The Tire and Rim Association, Inc. with pp. 1-01, 1-06, 1-08, 1-10, 1-12.
Excerpt from commercial brochure entitled "Organic Rubber Chemicals" dated Jul. 1, 1989, of Ouchi Shinko Chemical Industrial Co., Ltd.
Excerpt from Japanese commercial brochure entitled "Yuki Gomu Yakuhin Ichiranhyo" (Listing of Organic Chemicals) dated Jul. 1, 1989, of Ouchi Shinko Chemical Industrial Co., Ltd.
Copies of "Material Standards" issued by The Yokohama Rubber Co., Ltd., dated Jul. 1987 and Jun. 1992.

*Primary Examiner*—Michael W. Ball
*Assistant Examiner*—Nancy T. Krawczyk
*Attorney, Agent, or Firm*—Nikaido, Marmelstein, Murray & Oram

[57] ABSTRACT

A pneumatic radial tire for a passenger car, which includes a plurality of grooves provided on the surface of a tread and extending at least in a tire circumferential direction and a belt layer having a double layer structure and provided within the tread, characterized in that the total sectional area, $a$, of steel wires per 50 mm width of the belt layer is in a range satisfying $5 \leq a \leq 9$ mm$^2$, the depth, $d$, of the grooves is in a range satisfying $6.0 \leq d \leq 8.0$ mm, and the thickness, $t$, of rubber under the grooves defined as the distance from the bottom of the groove to the outermost belt layer is in a range satisfying $1.0 \leq t \leq 2.5$ mm.

6 Claims, 3 Drawing Sheets

PNEUMATIC RADIAL TIRE FOR PASSENGER CAR WITH DEFINED TREAD DEPTHS

BACKGROUND OF THE INVENTION

The present invention relates to a pneumatic radial tire for a passenger car having a tread-belt structure with two belt layers comprising steel cords, which is improved in driving stability with a reduction in the weight of the tire.

Environmental pollution spreading on an earth scale in recent years has brought about a strong demand for a further lowering in the fuel consumption of vehicles, and, as a part of it, a reduction in the weight of tire has become brought to the fore as a large technical task.

In a pneumatic radial tire for a passenger car, it is known that a high driving stability can be attained when the two belt layers comprise steel cords because the steel cords are far superior in the strength and the modulus of elasticity to other fiber cords. The steel cords, however, unfavorably increase the weight of the tire and the fuel consumption due to their high specific gravity, so that it is difficult for them to cope with the above-described technical task.

It has been believed that, in the pneumatic radial tire having a steel cord belt layer, the total sectioanl area of steel wires per 50 mm width of the steel belt layer must be at least 9.5 mm² in order to ensure the driving stability. Reduction in the weight of such a penumatic radial tire may be achievable by decreasing the quantity of wire in the steel cord of belt layer. However, by such a means, the bending rigidity of belt layer decreases, the cornering power drops, and driving stability is deteriorated. Accordingly, it has hitherto been thought practically impossible to reduce the weight of tire while maintaining or improving the excellent driving stability of a tire having a steel cord belt structure.

SUMMARY OF THE INVENTION

An object of the present invention is to provide a pneumatic radial tire for passenger car having two steel cord belt layers which can exhibit a driving stability comparable to or better than that of the conventional tire with a reduction in the weight of the tire.

In order to attain the above-described object, the penumatic radial tire for passenger car according to the present invention includes a plurality of grooves provided on the surface of a tread and extending at least in the tire circumferential direction and a belt layer having a double layer structure and provided within the tread, characterized in that the total sectional area, $\alpha$, of steel wires per 50 mm width of the belt layer is in a range satisfying $5 \leq \alpha \leq 9$ mm², the groove depth, d, is in a range satisfying $6.0 \leq d \leq 8.0$ mm, and the thickness t, of a rubber under the grooves defined as the distance from the bottom of the groove to the outermost belt layer is in a range satisfying $1.0 \leq t \leq 2.5$ mm.

As has been described above, in the tire of the present invention, the total sectional area, $\alpha$, of the steel wires per 50 mm width of steel cord belt layer is in the range of $5 \leq \alpha \leq 9$ mm which is smaller than 9.5 mm², i.e. the lower limit in the conventional tire and the groove depth d, and the thickness of rubber under the grooves, t, are both smaller than those of the conventional tire A combination of these constitutional features enables a reduction in the weight as compared with the weight of the conventional tire and a cornering power to be improved to a level comparable to or higher than that of the conventional tire, in spite of the face that the two belt layers are both constituted of steel cords having a smaller total sectional area, $\alpha$, of steel wires.

DETAILED DESCRIPTION OF THE PREFERRED EMBODIMENTS

Figure 2:
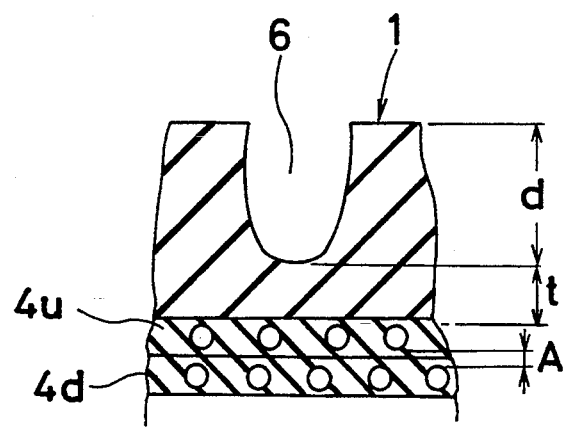
FIG. 2 is an enlarged sectional view of a main groove and a belt layer part provided on a tread of a tire according to the pre sent invention.

In the present invention, as shown in FIG. 2, the term "groove depth (d)" is intended to mean a distance measured to the deepest point of the bottom of the groove in the direction normal to the tread surface. The term "thickness (t) of rubber under the grooves" is intended to mean a distance from the deepest point of the groove to the cord surface of the outermost belt layer ($4u$) and defined as a distance to the outer belt layer independently of whether or not the belt layer is covered with the belt cover layer.

The expression "total sectional area, $\alpha$ (mm²), of steel wires per 50 mm width" is intended to mean a value represented by the following equation:

$$\alpha(mm^2) = n \times (\pi/4)a^2 \times E$$

wherein E represents an end count of steel cords per 50 mm width which appear on the cut surface of the belt layer when the tire is cut in the direction perpendicular to the direction of cord of the belt layer;

n represents the number of element wires per cord; and a (mm) represents the diameter of the element cord (mm).

Figure 1:
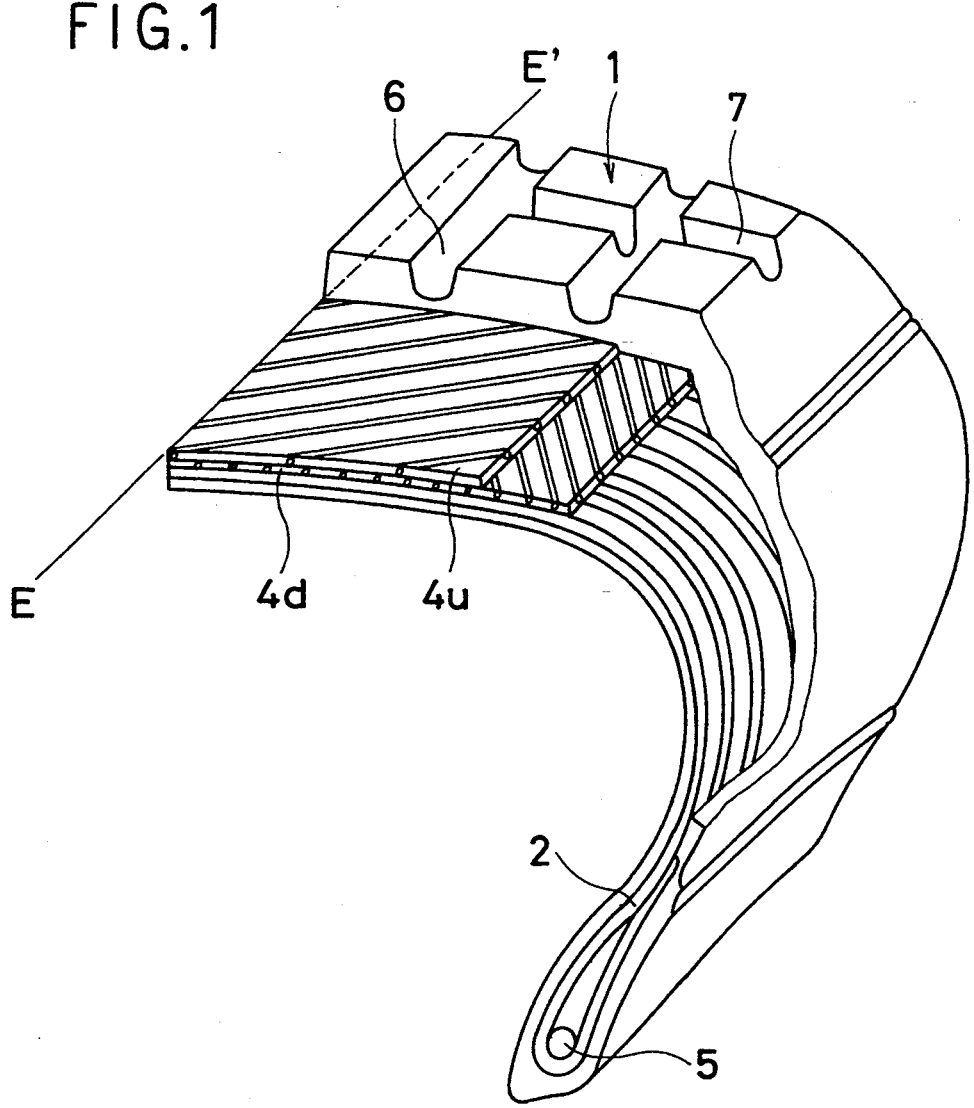
FIG. 1 is a partially cutaway schematic perspective view of the radial tire for passenger car according to an embodiment of the present invention.

An embodiment of the pneumatic radial tire for a passenger car according to the present invention is shown in FIG. 1 and FIG. 2. In the drawings, numeral 1 denotes a tread, and numeral 2 a carcass layer comprising organic fiber cords such as nylon cords or polyester cords. The carcass layer 2 is folded back and wound up around left and right bead cores 5 from the inside of the tire towards to the outside of the tire. The cord angle of the carcass 2 to the tire circumferential direction, EE′, is substantially 90°. A belt comprising two layers, i.e. an inner belt layer $4d$ and an outer belt layer $4u$, is disposed on the outside of the tread 1 of the carcass layer 2 over one round of the tire. The outer belt layer $4u$ and the inner belt layer $4d$ both comprise steel cords, and the total sectional area, $\alpha$, of the steel wires per 50 mm width is in the range of 5 to 9 mm². The cord angle of each of the inner belt layer $4d$ and the outer belt layer $4u$ to the tire circumferential direction EE′ is 5 to 40°, and the cords of the inner belt layer 4d and the cords of the outer belt layer 4u cross each other.

Main grooves 6 extending in the tire circumferential direction EE' and subgrooves 7 crossing the main grooves are provided on the surface of the tread 1. The groove depth, d, of the main grooves 6 is in the range satisfying $6.0 \leq d \leq 8.0$ mm, and the thickness, t, of rubber under the grooves is in the range satisfying $1.0 \leq t \leq 2.5$ mm.

In accomplishing the above-described invention, the present inventors have many faceted studies on factors having an influence on the cornering power of radial tire with a view to attaining the technical task on the reduction in the weight of the tire. As a result, as shown in the experiment examples which will be described later, they have found that the groove depth, d, of the grooves provided on the tread surface mainly in the tire circumferential direction and the thickness, t, of rubber under the grooves are main factors governing the cornering power and the cornering power increases with reduction in the groove depth, d, and thickness, t, of rubber under the grooves. This tendency is independent of the form of grooves in the tire circumferential direction which is straight or zigzag. Further, this is independent of whether or not subgrooves are provided in the tire width-wise direction. Thus, it has been found that, even if the quantity of steel cords in the two steel cord belt layers is decreased, the decrease in the driving stability caused thereby can be compensated for by making small the depth, d, of grooves provided on the tread surface and the thickness, t, of rubber under the grooves.

The present invention will now be described in more detail with reference to the following experiment examples.

Figure 3:
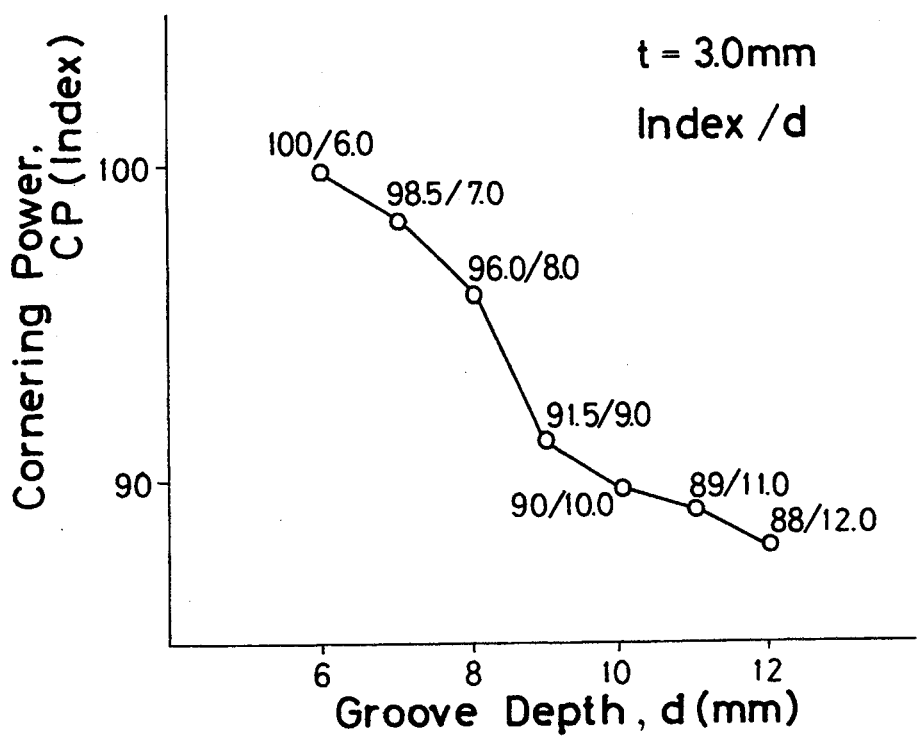
FIG. 3 is a graph illustrating the relationship between the groove depth, d, and the cornering power, CP.

The result of an experiment example on the relation between the groove depth, d, and the cornering power, CP, are shown in FIG. 3. This experiment was conducted on seven radial tires having the following identical tire structure with only the groove depth, d, being varied as 6 mm, 7 mm, 8 mm, 9 mm, 10 mm, 11 mm and 12 mm.
Tread structure: as shown in FIG. 1
Rim: 13×5J
Tire size: 165SR13
Belt structure:
  Number of belt layers: two
  Cord structure: steel cord, 1×2 (0.3 mm)
  End count: 49/50 mm
  Cord angle: 21°
  Width of belt layers: inner layer/outer layer = 125 mm/115 mm
Total sectional area of steel wires: 6.9 mm$^2$
Thickness, t, of rubber under the grooves: 3.0 mm The cornering power, CP, was measured as follows. In a drum test, when the tire is run under a load of 300 kgf at a speed of 10 km/hr, the lateral force at a right slip angle of 1° and the lateral force at a left slip angle of 1° were measured, and the average value of both the measurements (average value of absolute values) was expressed by an index, taking the measurement value of a tire having a groove depth of 6.0 mm as 100.

Figure 4:
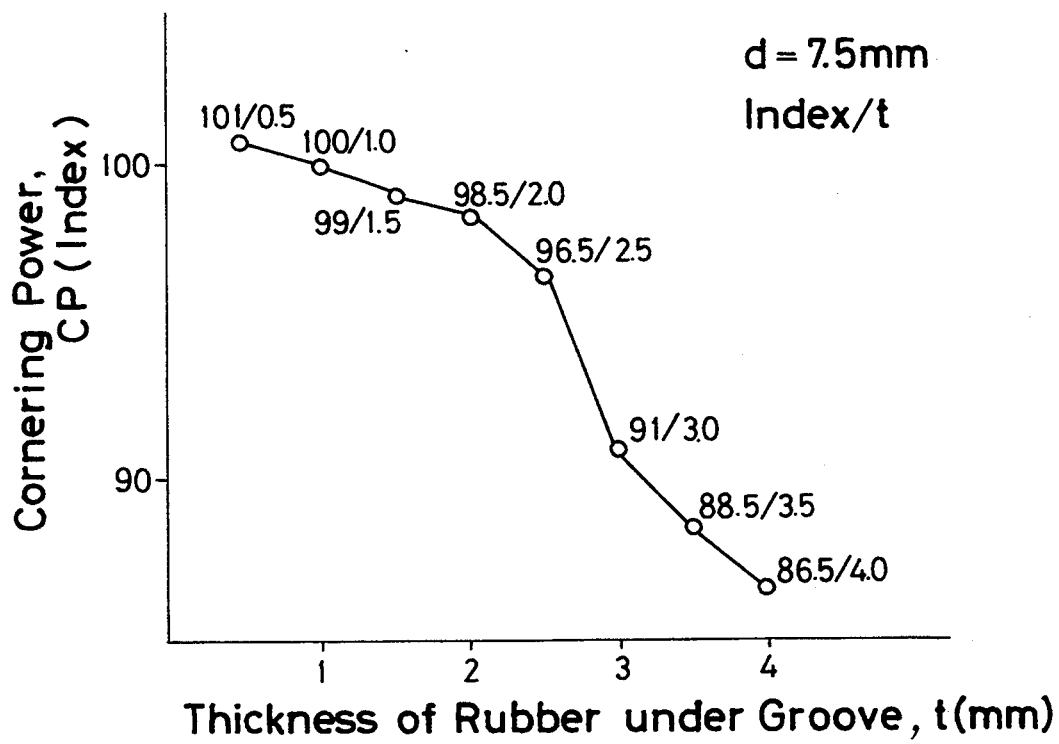
FIG. 4 is a graph illustrating the relationship between the thickness of a rubber under the grooves, t, and the cornering power, CP.

The results of an experiment on the relationship between the thickness, t, of rubber under the grooves and the cornering power, CP, are shown in FIG. 4. This experiment was conducted on eight radial tires having the same tread structure, tire size and belt structure as those in the above-described experiment and an identical groove depth (d) of 7.5 mm with only the end count being changed to 45/50 mm ($\alpha = 6.4$ mm$^2$) and the thickness, t, of rubber under the grooves being varied as 0.5 mm, 1.0 mm, 1.5 mm, 2.0 mm, 2.5 mm, 3.0 mm, 3.5 mm and 4.0 min. The cornering power, CP, was measured in the same manner as that described above and expressed by an index, taking the measurement value of a tire having a thickness, t, of rubber under the grooves of 1.0 mm as 100.

Regarding the groove depth, d, as is apparent from FIG. 3, the cornering power, CP, increases with reduction in groove depth, d, and rapidly increases when the groove depth, d, becomes 8.0 mm or less. This tendency is not limited to the tire having the above-described size used in the test, but a similar tendency is observed also in tires having other sizes. In the conventional radial tire, the groove depth, d, is generally 8 to 11 mm. On the other hand, in the present invention, with consideration of the results shown in FIG. 3, the groove depth, d, is limited to 6.0 to 8.0 mm, preferably 6.5 to 7.5 mm. The lower limit, i.e. 6.0 mm, is determined based on the abrasion life, and when the groove depth is smaller than this value, the practicability becomes poor.

Regarding the thickness, t, of rubber under the grooves, it is apparent from FIG. 4 that the cornering power, CP, increases with reduction in the thickness, t, of rubber under the grooves and rapidly increases particularly when the thickness, t, becomes 2.5 mm or less. This tendency is observed also in tires having other sizes. In the conventional radial tire, the thickness, t, of rubber under the grooves is generally 2.5 to 4 mm. On the other hand, in the present invention, with the consideration of the results shown in FIG. 4, the thickness, t, of rubber under the grooves is limited to 1.0 to 2.5 mm, preferably 1.0 to 2.0 min. The lower limit of the thickness, t, i.e. 1.0 mm, is a limit for protecting the belt cords and preventing the breaking of the cords.

In the present invention, the lowering in the cornering power in the case where the quantity of wire in the steel cord belt layer is decreased can be compensated for by decreasing the groove depth, d, and the thickness, t, of rubber under the grooves. However, the total sectional area, $\alpha$, of steel wires per 50 mm width of the steel cord belt layer lowered in the quantity of wire must be in the range of 5 to 9 mm$^2$ for the following reason.

Figure 5:
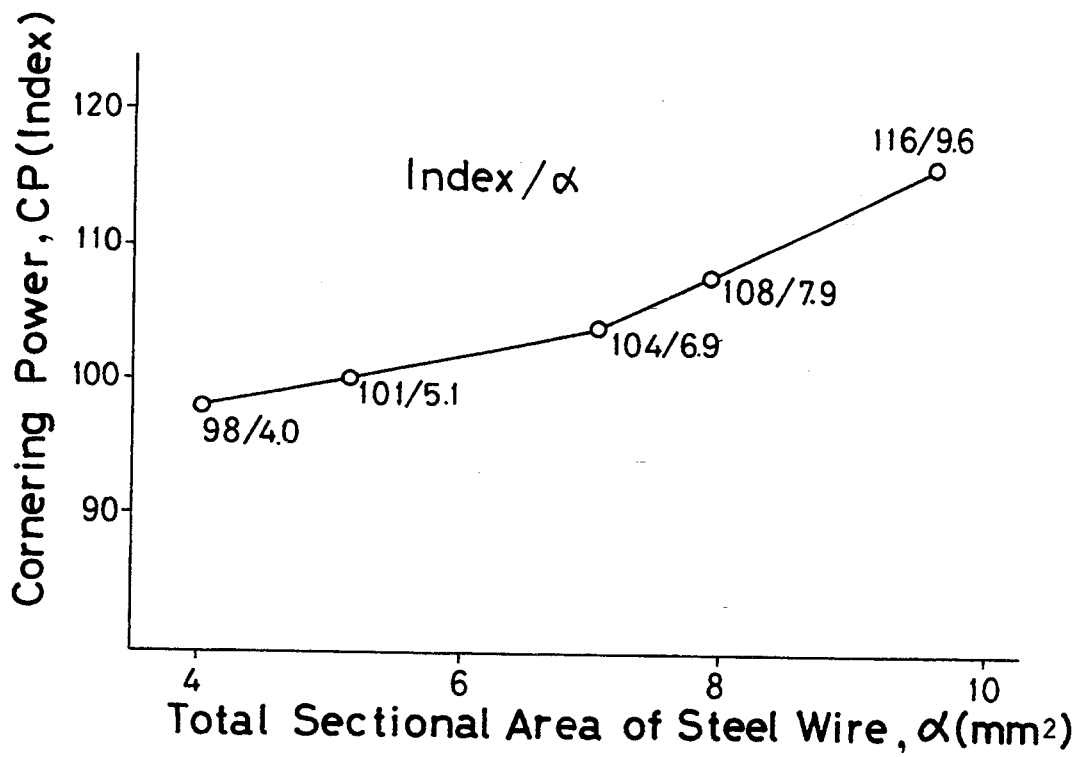
FIG. 5 is a graph illustrating the relationship between the total sectional area, $\alpha$, of steel wires and the cornering power, CP.

The results of an experiment on the relationship between the total sectional area, $\alpha$, of steel wires per 50 mm width of the steel belt layer and the cornering power, CP, regarding a radial tire wherein the two belt layers both comprise steel cords are shown in FIG. 5. This experiment was conducted on five tires having the same tread structure, tire size and belt structure (number of belt layers, cord structure, cord angle and belt width) as those in FIG. 3 and further having an identical groove depth, d, of 7.0 mm and an identical thickness, t, of rubber under the grooves of 2.0 mm with only the total sectional area, $\alpha$, of steel wires being varied as 4 mm$^2$, 5.1 mm$^2$, 6.9 mm$^2$, 7.9 mm and 9.6 mm$^2$ by varying the cord structure of steel belt layer and the end count.

The cornering power, CP, of each of the above-described tires was measured in the same manner as that described in FIG. 3 and expressed by an index, taking the measurement value of a conventional tire having the following construction as 100.

Construction of Conventional Tire

Tread structure: as shown in FIG. 1
Tire size: 165SR13
Belt structure:
  Number of belt layers: 2
  Cord structure: steel cord, 1×5 (0.25)
    End count: 39/50 mm
    Cord angle: 21°
    Width of belt layer: inner layer/outer layer = 125 mm/115 mm
    Total sectional area of steel wires: 9.6 mm$^2$
Groove depth, d: 9.0 mm
Thickness, t, of rubber under the grooves: 3.0 mm.

Figure 6:
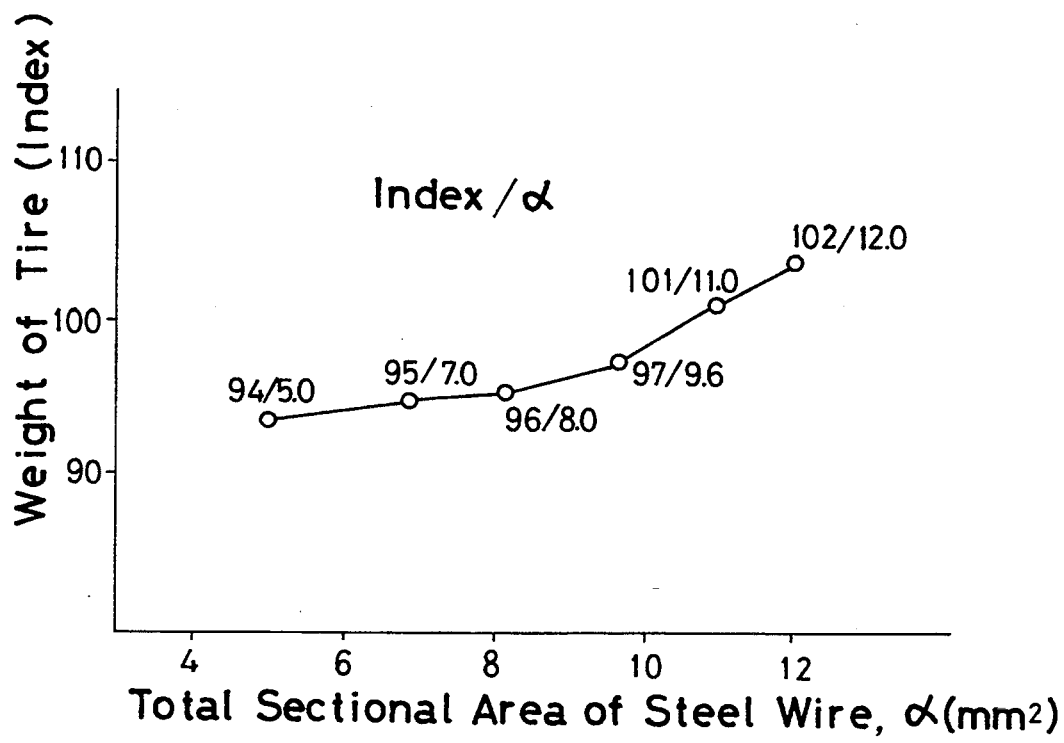
FIG. 6 is a graph illustrating the relationship between the total sectional area, $\alpha$, of steel wires and the weight of the tire.

The results of an experiment on the relationship between the total sectional area, $a$, of steel wires per 50 mm width and the weight of tire regarding the same tires as those used in the experiment of FIG. 5 are shown in FIG. 6. The weight of tire is expressed by an index, taking the weight of a conventional tire having two belt layers both comprising steel cords as 100. A smaller value of this index means a further reduction in tire weight.

As is apparent from FIG. 5, the cornering power, CP, can be improved to a level comparable to or better than that of the conventional tire when the above-described requirements for the groove depth, d, and the thickness, t, of rubber under the grooves are satisfied and the total sectional area, $a$, of steel wires in the steel belt layer is $a \geq 5$ mm$^2$. Regarding the weight of the tire, as in apparent from FIG. 6, when the total sectional area, $a$, of steel wires exceeds 11.0 mm$^2$, the weight of the tire becomes larger than that of conventional tire.

As is apparent from the results shown in FIGS. 5 and 6, in order to make the weight of the tire smaller than that of the conventional tire and make the cornering power equal to or better than that of the conventional tire, it is necessary to satisfy the above-described requirements for the groove depth, d, and the thickness, t, of rubber under the grooves and to set the total sectional area, $a$, of steel wires in the range of 5 to 9 mm$^2$, preferably the range of 6.5 to 8.0 mm$^2$.

In the present invention, there is no particular limitation on the steel cords used in the belt layers, so far as the total sectional area, $a$, of steel wires per 50 mm width are in the above-described range. Examples of the steel cords include a cord having a structure of 1×2 and comprising steel wires having an element wire diameter of 0.15–0.35 mm and a steel cord having a cord structure of 2+2 and comprising steel wires having an element wire diameter of 0.15–0.35 min. In order to achieve the object of the present invention, it is preferable to use a cord having a cord structure of 1×2 and comprising high tension wires. In these steel cords, the end count is adjusted so as to provide a total sectional area, $a$, of steel wires per 50 mm width as specified in the present invention.

Preferably, the steel cord used in the present invention is coated with a coat rubber of which modulus at 100% elongation (hereinafter referred to as 100% modulus) Mr, is in the range satisfying 35 kg/cm$^2 \leq$ Mr $\leq$ 55 kg/cm$^2$ and further preferably 40 kg/cm$^2 \leq$ Mr $\leq$ 50 kg/cm$^2$. By making Mr of the coat rubber greater than 35 kg/cm$^2$ the difference from the modulus of steel cord can be made small and the separation at the end of belt layer can be prevented. Further by making it not greater than 55 kg/cm$^2$, the steel cord can be made resistant to breaking.

It is also preferable to make the distance from the innermost surface of steel cord constituting the outer belt layer $4u$ to the outermost surface of steel cord constituting the inner belt layer $4d$, i.e. the belt-to-belt gate A, satisfy 0.4 mm $\leq$ A $\leq$ 0.9 mm, and further preferably 0.5 mm $\leq$ A $\leq$ 0.8 mm. By making A greater than 0.4 mm, the interlaminar shearing stress per unit volume can be made small the occurrence of separation can be prevented, and the durability can be improved. Further, by making A smaller than 0.9 mm, the lowering in the overall rigidity of the belt layer can be prevented and the effect of improving the cornering power brought about by decreasing the groove depth d, and thickness, t, of rubber under the grooves can additionally be enhanced.

Recommendably, the two belt layers are superposed so that their cord angles to the tire circumferential direction come to 5°–40° and preferably 15°–30°, their belt cords cross each other, and their tire width in the meridian direction comes to 80–130%, preferably 90°–110%, of the ground contact width.

According to the present invention, as has been described above, a pneumatic radial tire having a tread-belt structure with two belt layers constituted from steel cords is so constructed that the total sectional area, $a$, of the steel wires per 50 mm width of the steel cord belt layer is in the range of 5–9 mm$^2$ which is smaller than that of the conventional tire and the groove depth, d and the thickness, t of rubber under the grooves in the tread part are made smaller than those in the conventional tire. Owing to these constitutional features, the tire of the present invention can have a cornering power comparable to or better than that of the conventional tire and its driving stability can be improved while enjoying a reduction in the weight of the tire.

EXAMPLE

A tire 1 of the present invention, a tire 2 of the present invention, a tire 3 of the present invention, a tire 4 of the present invention and comparative tires 1 to 6 were prepared. They had the following identical tread rubber composition shown in Table 2 and identical tire size and belt structure and an identical tread pattern with the groove depth, d, thickness of rubber under grooves, t, the type of cords and structure of the inner and outer belt layers, the end count per 50 mm width and the total sectional area, $a$, of steel wires of the steel cord belt layer being varied as specified in Table 1.

Tire size: 165SR13
Belt structure: as shown in FIG. 1
  Number of belt layers: 2
  Width of belt layers: inner belt layer/outer belt layer = 120 mm/115 mm
  Cord angle: 21° to the tire circumferential direction in both the inner and outer belt layers Tread pattern: Four straight main grooves having a width of 6 mm were provided in the ground contact region of the tread along the tire circumferential direction to form five ribs substantially equal to one another in width. A plurality of subgrooves having a width of 4 mm and the same groove depth as that of the straight main grooves were formed at intervals of about 26 mm in the radial direction of the tire to divide the ribs into rectangular blocks, thereby forming a block pattern wherein 72 rectangular blocks were arranged in five rows on the tire circumferential direction.

These ten types of tires and the above-described conventional tire were subjected to an evaluation of the cornering power, CP, in the same manner as that the experiment of FIG. 3 and the wire breakage as follows, and the results of the evaluation are shown in Table 1 together with the comparison of weight per tire. The evaluation value of cornering power, CP, was expressed by an index using the measurement value of the conventional tire as 100 and the comparison of the weight per tire was expressed based on the weight of the conventional tire.

Wire Breakage:

Each tire having an identical air pressure of 1.4 kgf/cm$^2$ and using an identical rim of 13×5J was set on an indoor drum testing machine and made to run for 40 hours at a slip angle of ±4°, under a load of 300±200 kgf at a speed of 20 km/hr, after which the breakage of wire was evaluated according to the following criterion: o means that the number of broken wires is 3 or less, and × means that it exceeds 3.

the cornering power, CP, of these tires cannot attain the level of the conventional tire.

On the other hand, in the comparative tire 4 wherein the groove depth, d, is decreased, the thickness, t, of rubber under the grooves is decreased and the total sectional area, a, of steel wire is decreased to an excessive extent (4.8 mm$^2$), cornering power, CP, lowers and breakage of wire takes place, although the weight per tire decreases greatly (−1,210 g). In the comparative tire 5 wherein the groove depth, d, is decreased, the thickness, t, of rubber under the grooves is decreased and the total sectional area, a, of steel wires is made greater, breakage of wires similarly taken place although the cornering power, CP, is improved as compared with that in the conventional tire. In the comparative tire 6 wherein the groove depth, d, and the total sectional area, a, of steel wires are both decreased to appropriate extents, breakage of wires takes place if the thickness, t, of rubber under the grooves is decreased to an excessive extent breakage of wires takes place although the cornering power, CP, can be improved.

Contrariwise, in the tire 1 of the present invention

TABLE 1

|  | Conventional Tire | Comparative Tires | | | | | | Tires of the Present Invention | | | |
| --- | --- | --- | --- | --- | --- | --- | --- | --- | --- | --- | --- |
|  |  | 1 | 2 | 3 | 4 | 5 | 6 | 1 | 2 | 3 | 4 |
| groove depth, d (mm) | 9.0 | 9.0 | 6.0 | 9.0 | 6.0 | 7.5 | 6.0 | 8.0 | 6.0 | 7.5 | 7.5 |
| thickness of rubber under grooves, t (mm) | 3.0 | 3.0 | 3.0 | 1.0 | 1.0 | 1.5 | 0.5 | 2.5 | 1.0 | 1.5 | 1.5 |
| total sectional area of steel wires, a (mm$^2$) | 9.6 | 6.9 | 5.9 | 6.9 | 4.8 | 9.6 | 6.9 | 6.9 | 5.1 | 9.0 | 9.0 |
| cord structure | 1 × 5 | 1 × 2 | 1 × 2 | 1 × 2 | 1 × 2 | 1 × 5 | 1 × 2 | 1 × 2 | 1 × 2 | 1 × 2 | 2 + 2 |
| element wire diameter (mm) | 0.25 | 0.30 | 0.30 | 0.30 | 0.30 | 0.25 | 0.30 | 0.30 | 0.30 | 0.30 | 0.25 |
| end count | 45 | 49 | 49 | 49 | 34 | 45 | 49 | 49 | 36 | 64 | 46 |
| CP | 100 | 90 | 98 | 99 | 98 | 109 | 111 | 101 | 106 | 108 | 108 |
| wire breakage test | O | O | O | O | X | X | X | O | O | O | O |
| weight of tire (g) | reference standard | −225 | −655 | −745 | −1210 | −380 | −1060 | −485 | −1165 | −420 | −420 |

TABLE 2

| Compounding ingredient | Amount of compounding (pt. wt.) |
| --- | --- |
| SBR[1] | 137.5 |
| zinc oxide | 1.5 |
| stearic acid | 2.0 |
| antioxidant[2] | 1.8 |
| wax[3] | 1.0 |
| carbon black HAF | 70.0 |
| aromatic oil | 3.0 |
| vulcanization acceleration[4] | 2.5 |
| sulfur powder | 2.1 |
| 100% modulus | 43 kg/cm$^2$ |

Note: in Table 2,
[1]: "Nipol 1712" manaufactured by Nippon Zeon Co., Ltd.
[2]: such as, N-phenyl-N'-(1,3-dimethylbutyl)-p-phenylene diamine of the tradename
[3]: such as, a selected special wax of the tradename
[4]: such as, N-Oxydiethylene-2-benzothiazylsulfenamide of the tradename As is apparent from Table 1, although the comparative tire 1 wherein only the total sectional area, a, of steel wires is reduced as compared with that of the conventional tire can reduce the weight per tire by 225 g, the cornering power, cp, lowers by as large as 10%. Although the comparative tire 2 wherein only the groove depth, d, is decreased in the comparative tire 1 and the comparative tire 3 wherein only the thickness, t, of rubber under the grooves is decreased in the comparative tire 1 can reduce the weight per tire additionally, where in the total sectional area, a, of the steel wires is made smaller and the groove depth, d, and the thickness, t of rubber under the grooves are both reduced to values close to their upper limits specified in the present invention, the weight per tire can be reduced (−485 g) to an extent greater than in the comparative tire 1 with a slight improvement in the cornering power, CP. In the tire 3 of the present invention and in the tire 4 of the present invention wherein the groove depth, d, and the thickness, t, of rubber under the grooves are respectively made equal to that of the comparative tire 5 and the total sectional area, a, of steel wires is made close to the upper limit specified in the present invention, the weight per tire can be reduced to an extent greater than in the comparative tire 5 without occurrence of breakage of wire. Further, it the groove depth, d, the thickness, t, of rubber under the grooves and the total sectional area, a, of steel wires are all adjusted to the optimum values in the present invention as in the comparative tire 2 of the present invention, the weight per tire can be reduced to an excellent extent (−1,165 g) and at the same time the cornering power, CP, is explicitly improved.

What is claimed is:

1. A pneumatic radial tire for a passenger car, which includes a plurality of grooves provided on the surface of a tread and extending at least in a tire circumferential direction and a belt layer having a double layer structure with both layers formed of steel cords and provided within the tread, wherein the total sectional area, $\alpha$, of steel wires per 50 mm width of belt layer is in a range satisfying $5 \leq \alpha \leq 9$ mm²; the groove depth, d, is in a range satisfying $6.0 \leq d \leq 8.0$ mm; the thickness, t, of rubber under the grooves defined as the distance from the bottom of the groove to the cord surface of the outermost belt layer independent of any belt cover layer is in a range satisfying $1.0 \leq t \leq 2.0$ mm; the angles of the steel cords constituting the belt layer having a double layer structure to the tire circumferential direction are both 5–50°; and the steel cords in the two belt layers cross each other.

2. A pneumatic radial tire for a passenger car according to claim 1, wherein said steel cord is constituted of steel wires having an element wire diameter of 0.15 to 0.35 mm and has a cord structure of $1 \times 2$.

3. A pneumatic radial tire for a passenger car according to claim 2, wherein said steel wire is constituted of a high tension wire.

4. A pneumatic radial tire for a passenger car according to claim 1, wherein the modulus, Mr, at 100% elongation of the coat rubber covering said steel cord is in a range satisfying 35 kg/cm² < Mr $\leq$ 55 kg/cm².

5. A pneumatic radial tire for a passenger car according to claim 1, wherein the distance, A, from the innermost surface of the steel cord constituting the outer belt layer to the outermost surface of the steel cord constituting the inner belt layer, i.e. the belt-to-belt gage, is in a range satisfying 0.4 mm < A < 0.9 mm.

6. A pneumatic radial tire for a passenger car according to claim 1, wherein the width of said belt layer in the meridian direction is in the range of 80 to 130% of the ground contact width of the tire.

* * * * *